(12) United States Patent
Miyashita et al.

(10) Patent No.: US 8,188,397 B2
(45) Date of Patent: May 29, 2012

(54) SHEET SWITCH MODULE

(75) Inventors: Isao Miyashita, Fujiyoshida (JP); Kenshi Aihara, Fujiyoshida (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 730 days.

(21) Appl. No.: 11/957,119

(22) Filed: Dec. 14, 2007

(65) Prior Publication Data
US 2008/0151526 A1 Jun. 26, 2008

(30) Foreign Application Priority Data

Dec. 14, 2006 (JP) ................ P2006-337002

(51) Int. Cl.
*H01H 9/00* (2006.01)
(52) U.S. Cl. ........................ 200/310; 200/314
(58) Field of Classification Search .......... 200/510–517, 200/310–314, 341–345
See application file for complete search history.

(56) References Cited

U.S. PATENT DOCUMENTS 4,124,879 A 11/1978 Schoemer
7,411,142 B2 * 8/2008 Jung et al. .............. 200/314
7,446,275 B2 * 11/2008 Lee et al. ................ 200/314
2007/0039809 A1 2/2007 Aihara et al.

FOREIGN PATENT DOCUMENTS

| CN | 1866439 A | 5/2006 |
|---|---|---|
| EP | 1729205 A2 | 12/2006 |
| JP | 2001167655 | 6/2001 |
| JP | 2001358816 | 12/2001 |
| JP | 2004069751 | 3/2004 |

OTHER PUBLICATIONS

Office Action in corresponding Chinese appl. No. 200710169192.9, mailed Nov. 10, 2011.

* cited by examiner

*Primary Examiner* — Renee S Luebke
*Assistant Examiner* — Marina Fishman
(74) *Attorney, Agent, or Firm* — Browdy and Neimark, PLLC

(57) ABSTRACT

A sheet switch module (21) including a circuit board (22), at least one key switch (25) mounted on one surface of the circuit board (22), a light-guiding sheet unit (30) covering one surface of the key switch (25), at least one LED (26) mounted on the circuit board (22) to enter light into the light-guiding sheet unit (30), the light-guiding sheet unit (30) being formed by a plurality of light-guiding sheets (31,32) at least parts of which are overlapped, the key switch (25) being illuminated by the LED (26) by way of plurality of light-guiding sheets (31,32).

11 Claims, 6 Drawing Sheets

SHEET SWITCH MODULE

CROSS-REFERENCE TO THE RELATED APPLICATION

This application is based on and claims priority from Japanese Patent Application No. 2006-337002, filed on Dec. 14, 2006, the disclosure of which is incorporated herein by reference in its entirety.

BACKGROUND OF THE INVENTION

1. Field of the Invention

The present invention relates to a sheet switch module which is, for example, installed in an operation panel used for various electronic instruments and has an illumination function.

2. Description of Related Art

Most conventional operation panels installed in various electronic instruments such as mobile phones, mobile information terminals or the like have been structured using key switches incorporating an illumination function. Various illumination functions have been proposed, including a structure in which light sources such as light emitting diodes (LEDs) are disposed corresponding to individual pressing parts (key tops) which constitute the key switches, or alternatively, a structure making use of a light-guiding plate, whereby each of the key tops can be efficiently illuminated by a minimum number of LEDs (for reference, see Japanese Patent Laid-Open No. 2004-69751, FIG. 9).

FIG. 7 illustrates a structural example of a key switch 1 using a light-guiding plate.

The key switch 1 includes a circuit board 2 provided with a plurality of fixed contacts 3 and wiring patterns (not shown), a movable contact 4 which comprises a tact spring and is disposed to cover each of the fixed contacts 3, a light-guiding plate 5 disposed above the circuit board 2, LEDs 6 to illuminate a side surface of the light-guiding plate 5, and a key top 7 which has a lower end portion disposed to pass through the light-guiding plate 5 and is configured to press each movable contact 4.

In the key switch 1, all the key tops 7 can be illuminated by guiding light from the LEDs 6 to the lower end portion of each of the key tops 7 passing through the light-guiding plate 5.

To deal with the recent trend towards thinning of electronic devices, there has also been proposed an even thinner key switch having an illumination function (for reference, see Japanese Patent Laid-Open No. 2004-69751, FIG. 6).

FIG. 8 illustrates a structure of a key switch 11 disclosed in Japanese Patent Laid-Open No. 2004-69751.

The key switch 11 includes a sheet switch part 18 having a circuit board 12 provided with fixed contacts 13 and movable contacts 14 disposed to cover the fixed contacts 13, a light-guiding plate 15 covering above the sheet switch part 18, LEDs 16 disposed to face a side surface of the light-guiding plate 15, and key tops 17 disposed above the light-guiding plate 15 to face the movable contacts 14. In the key switch 11, the entire light-guiding plate 15 is illuminated by directing light emitted from the LEDs 16 to the side surface of the light-guiding plate 15, and the key tops 17 are illuminated from the under side by the light emitted from the light-guiding plate 15.

However, in key switches having the above-mentioned kind of structure in which the LEDs are disposed in the vicinity of the key tops, the number of LEDs must be increased as the number of key tops increases.

This results in problems of increased power consumption and a key switch being larger.

In the key switch 1 as shown in FIG. 7, because the light is guided toward the key tops by the light-guiding plate 5, sufficient light can be supplied by a small number of LEDs, but it is necessary for the light-guiding plate 5 to have a thickness greater than a certain minimum level in order to efficiently guide light emitted from the LEDs 6 toward the key tops without leakage of light. However, because the increment in thickness of the light-guiding plate causes an increase in thickness of the key switch, the problem arises that the key switch cannot be thinned.

On the other hand, in the key switch 11 as shown in FIG. 8, because light emitted from the LEDs 16 enters one end of the light-guiding plate 15 for the light-guiding plate 15 being illuminated and is guided through the light-guiding plate 15 to the entirety of the key tops 17, the problem arises that brightness of the key tops 17 distant from the LEDs 16 is reduced and consequently variations in brightness of the key tops 17 become highly visible. Also, because the light-guiding plate 15 is merely placed on the sheet switch part 18, a gap is easily generated between the light-guiding plate 15 and the sheet switch part 18. In addition, a gap is easily generated between the light-guiding plate 15 and each of the LEDs 16. When a gap arises in a circumferential part of the light-guiding plate 15, light leaks from the gap as a result and the problem arises that an insufficient amount of light is guided into the key tops 17 and variations in brightness occur. Therefore, it is difficult to achieve an illumination effect of the key tops 17 only being intensively lighted as a conventional device.

SUMMARY OF THE INVENTION

An object of the present invention is to provide a sheet switch module capable of lighting a plurality of key switches in groups by a small number of light emitting elements and guiding light emitted from the light emitting elements toward the key switches efficiently and uniformly.

To accomplish the above object, a sheet switch module according to one embodiment of the present invention includes a circuit board, at least one key switch mounted on the circuit board, a light-guiding sheet unit covering an upper surface of the key switch, and at least one light source mounted on the circuit board to emit light into the light-guiding sheet unit.

The light-guiding sheet unit is formed by at least two light-guiding sheets that are overlapped at least in part.

The key switch is illuminated by the light source by way of the plurality of light-guiding sheets.

In addition, in the case that light-guiding patterns which guide light emitted from the light source in a predetermined direction and then emit the light are provided on each of the light-guiding sheets, a shape of the light-guiding patterns is formed differently for each of the light-guiding sheets. Consequently, the key switches are possible to be illuminated distinctly in a predetermined display or as a functional group unit.

DETAILED DESCRIPTION OF THE PREFERRED EMBODIMENTS

Preferred embodiments of the present invention will be explained in detail below with reference to the accompanying drawings.

Figure 1:
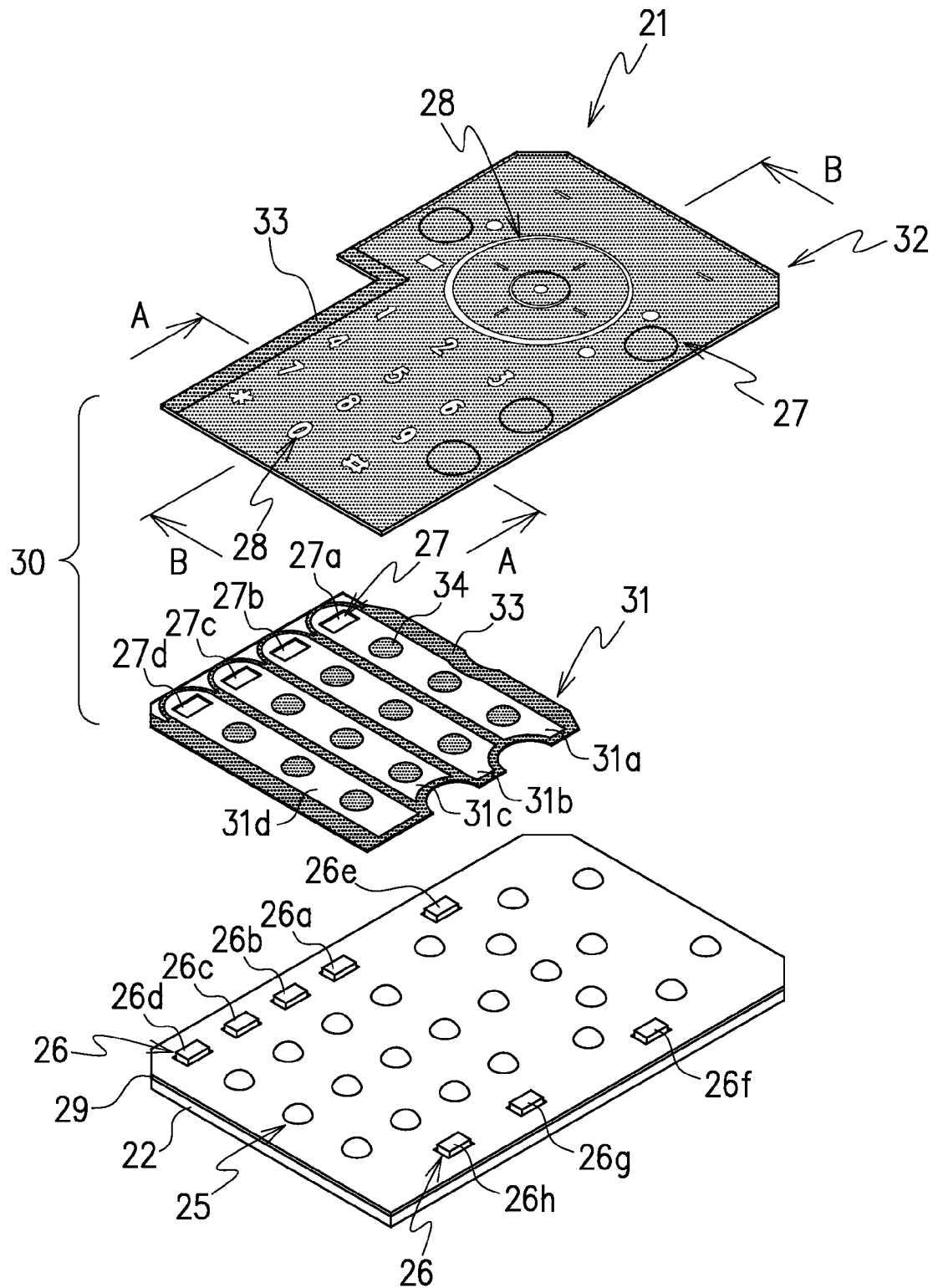
FIG. 1 is an exploded perspective view showing a sheet switch module according to the present invention.
Figure 2:
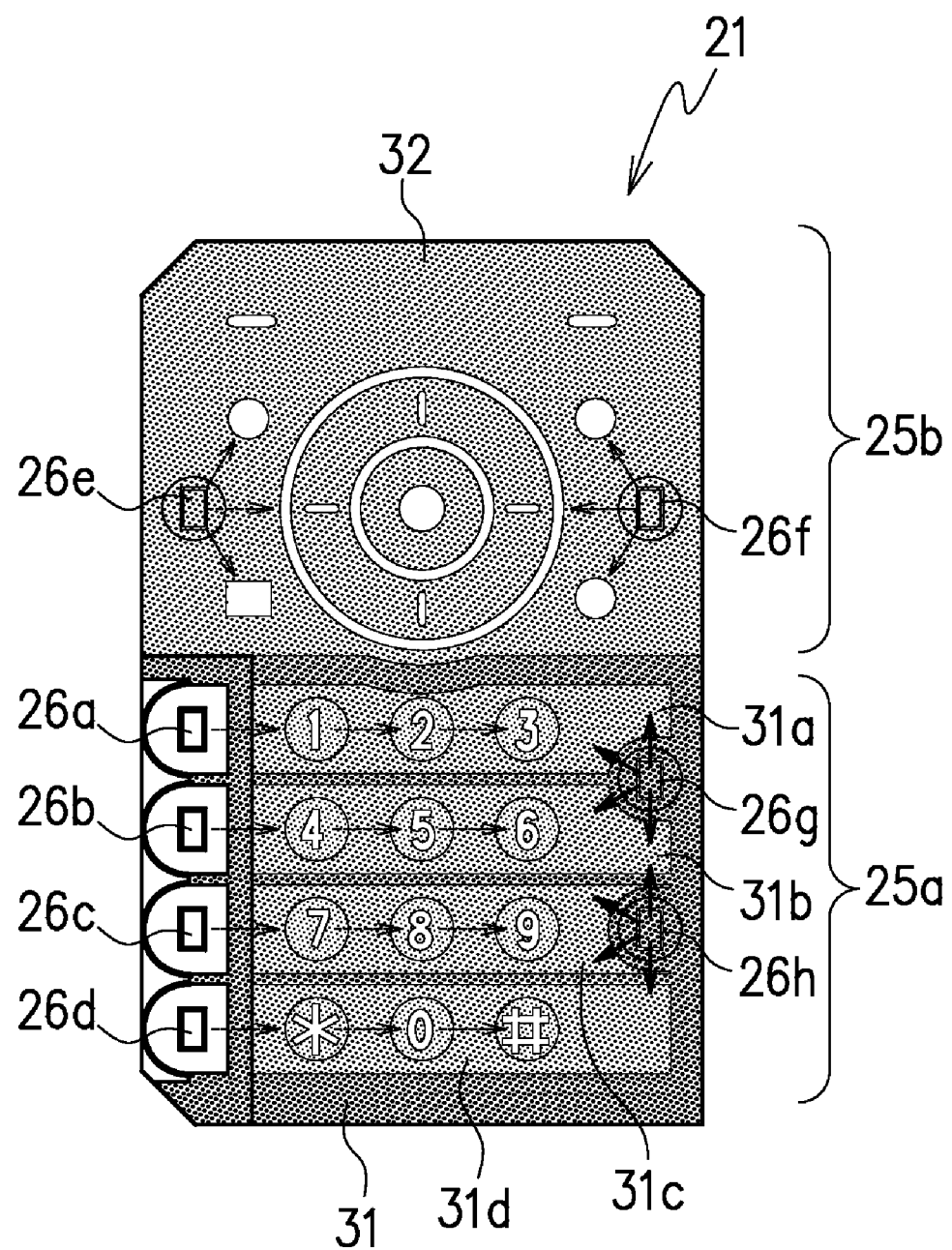
FIG. 2 is a plan view of the sheet switch module shown in FIG. 1.
Figure 3:
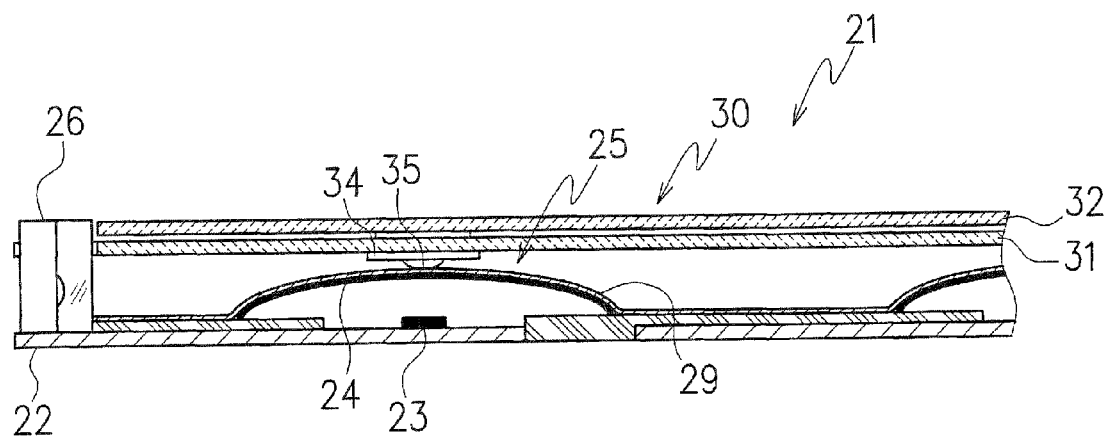
FIG. 3 is a partially enlarged sectional view showing a structure of the sheet switch module shown in FIG. 1.

FIGS. 1 to 3 illustrate one embodiment of a sheet switch module according to the present invention.

The sheet switch module 21 includes a circuit board 22, at least one key switch 25 mounted on one surface, for example, an upper surface of the circuit board 22, at least one light source, for example, at least one light emitting diode (LED) 26 mounted on the upper surface of the circuit board 22, a fixing sheet 29 which is in close contact with the key switch 25, configured to cover the key switch 25 and to fix it on the upper surface of the circuit board 22, and a light-guiding sheet unit 30 which is disposed on the fixing sheet 29 covering the key switch 25.

It should be noted that, in the illustrated embodiment, a plurality of key switches 25 and a plurality of LEDs 26 are respectively disposed on the circuit board 22 in a predetermined arrangement.

In one embodiment, the light-guiding sheet unit 30 includes a first light-guiding sheet 31 which is disposed on the plurality of key switches comprising a ten-key group 25a (see FIG. 2) and a second light-guiding sheet 32 which is partially overlapped with the first light-guiding sheet 31 and disposed on the plurality of key switches 25 comprising a cross-key group 25b (see FIG. 2).

Figure 4:
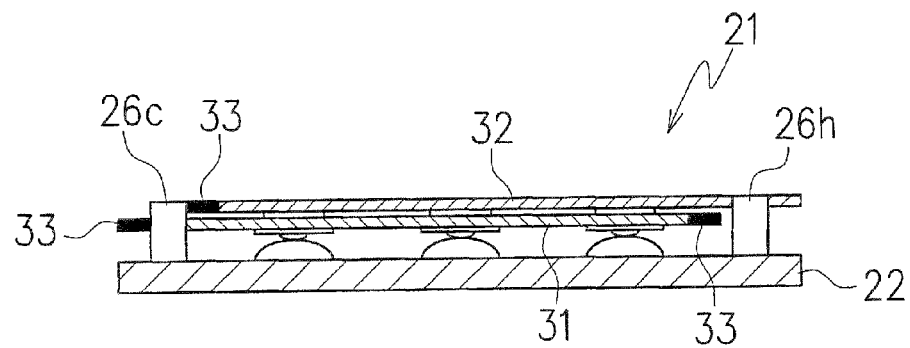
FIG. 4 is a sectional view taken along line A-A in FIG. 1, showing the sheet switch module.
Figure 5:
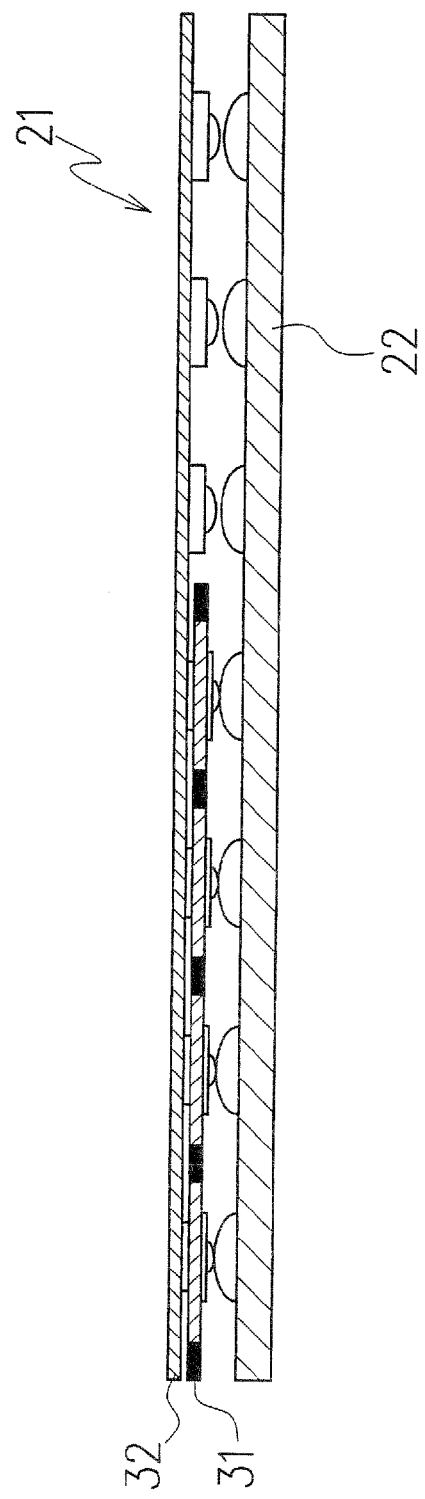
FIG. 5 is a sectional view taken along line B-B in FIG. 1, showing the sheet switch module.

The circuit board 22 is formed by a resinous plate made from a glass epoxy material or the like, or by a bendable and flexible plate as used for an FPC (flexible printed circuit). Electrodes and wiring patterns extending from the electrodes used to mount the key switches 25 and the LEDs 26 are provided on a surface, for example, the upper surface of the circuit board 22, as shown in FIGS. 2, 4 and 5. Each of the key switches 25 includes a fixed contact 23 disposed on the circuit board 22 and a movable contact 24 which is disposed to cover the fixed contact 23 without making contact with the fixed contact 23 and comprises, for example, a semi-spherical tact spring or the like, as shown in FIG. 3.

Each of the LEDs 26 includes on a lower surface thereof a pair of element electrode parts having an anode and a cathode that are electrically connected to the electrodes on the circuit board 22. Each of the LEDs 26 also includes on one side surface thereof an emission surface which is disposed to be oriented towards the inside of the circuit board 22 and in parallel with edges of the first and second light-guiding sheets 31 and 32, respectively.

The fixing sheet 29 is formed by a white or metallic-colored thin sheet configured to reflect light and is in close contact with each of the key switches 25 to cover said key switches 25. The fixing sheet 29 is configured to fix each of the key switches 25 and efficiently reflect light guided into the key switches 25 upwardly, thereby further enhancing illumination efficiency of the key switches 25.

It should be noted that, in the case that each of the key switches 25 has a convex-shaped head, the fixing sheet 29 has a concave portion configured to adapt to the convex-shaped head, so that the key switches 25 can be accurately positioned on and fixed to the circuit board 22.

Each of the first and second light-guiding sheets 31 and 32 is formed by a transparent or translucent thin sheet material, preferably by, for example, a material with good light-guiding properties such as acrylic resin, silicone resin, polycarbonate resin, polyethylene terephthalate resin or the like. A thickness of each of the light-guiding sheets 31 and 32 is not limited to a particular value, but should preferably fall within a range of 0.05 mm to 0.3 mm in consideration of light-guiding efficiency of the light-guiding sheets and clicking sensation of the key switches 25.

As shown in FIG. 1, the first light-guiding sheet 31 includes, for example, light-guiding patterns 31a to 31d to divide the ten-key group 25a corresponding to displays of numbers, alphabet letters, other signs or the like into four display groups and light shielding areas 33 to separate the light-guiding patterns 31a to 31d. Each of the light-guiding patterns 31a to 31d is transparent or translucent, and each of the light shielding areas 33 is printed by, for example, a black color-type paint or the like to absorb light.

The light shielding areas 33 partition the light-guiding patterns 31a to 31d to prevent leakage of light from each of the light-guiding areas to other light-guiding areas.

Light-receiving parts 27a to 27d are provided at ends of the light-guiding patterns 31a to 31d of the first light-guiding sheet 31 and at positions corresponding to the LEDs 26 mounted on the circuit board 22, for example, LEDs 26a to 26d, respectively. The light-receiving parts 27a to 27d are formed by, for example, openings which allow passage of the LEDs 26a to 26d or embossed portions housing them. The light-receiving parts 27a to 27d act to efficiently guide light emitted from the LEDs 26a to 26d to the first and second light-guiding sheets 31 and 32.

As shown in FIG. 3, a reflection film 34 to upwardly reflect light emitted from each of the LEDs 26a to 26d is provided facing each of the key switches 25 on a rear surface of each of the light-guiding patterns 31a to 31d of the first light-guiding sheet 31. The reflection film 34 comprises, for example, a metallic film such as silver, aluminum or the like and is formed by evaporation. Furthermore, to improve the clicking sensation or switching efficiency of the key switches 25, a protrusion 35 is provided on a lower surface of the reflection film 34 and disposed to be in contact with a central portion of the corresponding key switches 25.

The protrusion 35 is formed by screen printing or inkjet printing using a light-transmitting resin. The protrusion 35 may be formed by a potting process to build up a coating of light-transmitting resin on a surface of the first light-guiding sheet 31. In addition, the protrusion 35 may be formed by transferring an adhesive resinous molding article or sheet which has been previously formed in accordance with a shape of the protrusion onto a surface of the first light-guiding sheet 31.

Furthermore, to illuminate the entirety of the ten-key group 25a and the cross-key group 25b, as shown in FIG. 2, the whole of the second light-guiding sheet 32 apart from the light shielding areas formed at portions overlapping with the LEDs 26a to 26d is formed into a transparent or translucent light-guiding pattern. A ten-key display part and a cross-key display part corresponding to the ten-key group 25a and the cross-key group 25b, respectively, are printed on the second light-guiding sheet 32 using a white-color-type paint. The main source of lighting for the second light-guiding sheet 32 is provided by LEDs 26e to 26h. A reflection film and a protrusion are provided also on the places of the second light-guiding sheet 32 corresponding to each of the key switches 25 of the cross-key group 25b and embossed light-receiving parts 27 are provided on the places of the second light-guiding sheet 32 corresponding to the LEDs, in the same way as for the first light-guiding sheet 31. In addition, a thin spacer (not shown) disposed to face each of the protrusions 35 of the first light-guiding sheet 31 is provided on a back surface of the second light-guiding sheet 32.

It should be noted that the circuit board 22 is to be mounted on a mother board (not shown). Electrical connection means to the mother board such as wiring patterns, electrodes, connectors, and so on (not shown) are provided on the circuit board 22.

Next, one example of illumination operation of the above-mentioned sheet switch module is described with reference to FIGS. 1 and 2.

A current is applied from the mother board or the like through the connectors provided on the circuit board 22 to the LEDs 26a to 26h. Of the LEDs 26a to 26h, the LEDs 26e to 26h illuminate the entire second light-guiding sheet 32, allowing lighting of the ten key display part and the cross key display part, thereby making it easy to see said display parts even in a dark place. On the other hand, light emitted from the LEDs 26a to 26d is guided individually to each of the corresponding light-guiding patterns 31a to 31d. Therefore, by having different emission colors or different levels of emission brightness for the LEDs 26a to 26d, it is possible to obtain various emission effects such as different color tones. It is also possible to obtain illumination effects such as display of alternately blinking light-guiding patterns by controlling the emission of the LEDs.

In this way, in one embodiment, it is possible to achieve various emission effects according to the arrangement of the key switches 25 by having a structure for the light-guiding sheet part 30 configured to partially overlap the first light-guiding sheet 31 and the second light-guiding sheet 32 and by providing predetermined light-guiding patterns on each of the first and second light-guiding sheets 31 and 32. In particular, by overlapping the light-guiding sheets, it is easy to form gradations in which the tone or the like of the arrangement of key switches 25 is changed gradually, and it is therefore possible to obtain soft emission effects from the entirety of key switches. Also, it is possible to obtain various emission effects with a small number of LEDs and therefore achieve a reduction in mounting space and power consumption of the LEDs because the light-guiding patterns have various light-guiding properties.

In a case that the light-guiding patterns which guide light emitted from the light source in a predetermined direction and then emit the light are provided on each of the light-guiding sheets, a shape of the light-guiding patterns is formed differently for each of the light-guiding sheets. Consequently, the key switches are able to be lighted and displayed distinctly as a predetermined display or as a functional group unit.

In the above-mentioned embodiment, the light-guiding sheet unit 30 includes the first light-guiding sheet 31 and the second light-guiding sheet 32 which are disposed to be separated and overlapping on the circuit board 22 sequentially. However, the first and second light-guiding sheets 31 and 32 may be integrally formed by bending one light-guiding sheet at a predetermined place. With the light-guiding sheet having such a structure, the formation of light-guiding patterns and reflection films can be achieved collectively, and the operation to overlap the first and second light-guiding sheets is not required because it is sufficient to form the light-guiding sheet part by merely bending one light-guiding sheet.

It is also possible to achieve an improvement in reflection rate and an improvement in brightness due to light scattering effects by providing a mirror surface portion formed by a mirror surface process, or a fine concave and convex portion formed by a concave and convex process or a texturing or the like, on at least an upper surface portion of the light-guiding sheet unit 30 facing each of the movable contacts 24. Each of the movable contacts 24 need not be made of a metallic material, and may, for example, comprise a flexible resinous plate which is formed in a domed shape by an embossed process as a tact spring, a movable contact electrode which is provided on a back surface of the flexible resinous plate and electrically connected to the fixed contact 23 and a reflecting metallic film which is provided on a front surface of the flexible resinous plate by plating or evaporation or formed by applying a paint including fine metallic or glass particles with a light-reflection effect onto the flexible resinous plate. It is possible to obtain a soft clicking sensation different from that of the metallic tact spring as mentioned above by forming each of the movable contacts 24 by the flexible resinous plate.

One way of effectively guiding light entering the light-guiding sheet unit 30 to the area above the movable contacts 24 is to form a light reflection member or light scattering part on a front or back surface of the light-guiding sheet unit 30. For example, application of a light reflection member comprising a white or silver-type paint onto the back surface of the light-guiding sheet unit 30 makes it possible to intensively illuminate the movable contacts 24 without the light guided in the light-guiding sheet unit 30 being absorbed in the circuit board 22.

In addition, the formation of a light scattering part which includes a plurality of concave and convex portions on the upper surface of the light-guiding sheet unit 30 causes the light guided in the light-guiding sheet unit 30 to be directed and emitted toward the key switches 25 while diffusing light. Such a light scattering part can be easily formed by providing a texturing portion on the mold used when producing the first or second light-guiding sheets.

It should be noted that, in the above-mentioned embodiment, although the light-guiding sheet unit applied to a display part of a general mobile phone including ten-key and cross-key display parts has been shown, it is possible to arbitrarily set the shapes of the light-guiding patterns or the arrangements of the LEDs corresponding to said shapes of the light-guiding patterns according to the structure of the display part of various electronic instruments. Moreover, in the above-mentioned embodiment, although two light-guiding sheets have been used, three light-guiding sheets may also be used. In any case, it is possible to obtain various emission effects depending on the number of light-guiding sheets being overlapped.

In addition, in the above-mentioned embodiments, although the light-guiding sheet unit 30 is structured by overlapping the first and second light-guiding sheets 31 and 32 partially, a plurality of light-guiding sheets may be overlapped entirely.

Figure 6:
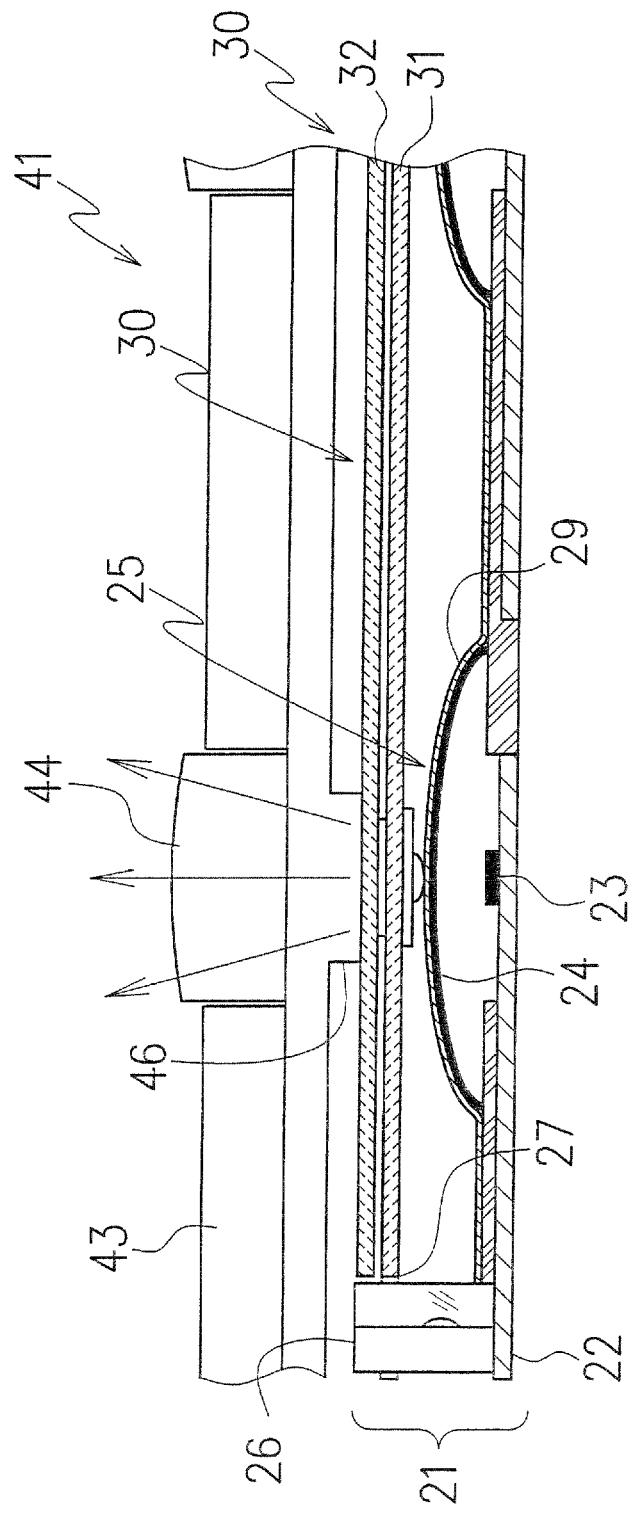
FIG. 6 is a sectional view showing one example of a switch panel in which the sheet switch module is installed.
Figure 7:
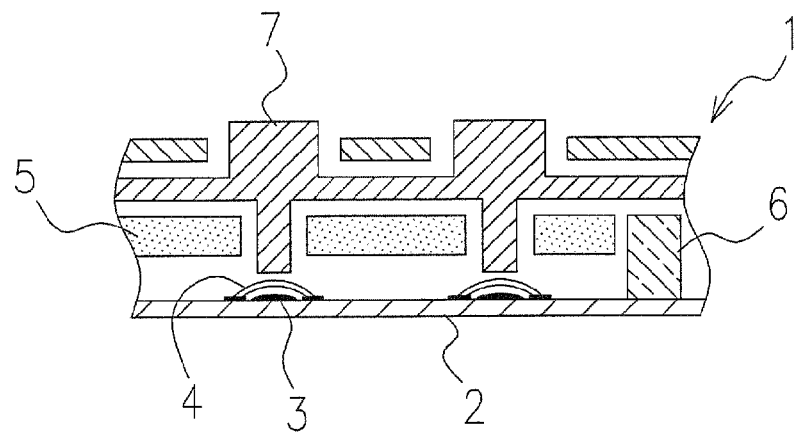
FIG. 7 is a sectional view showing a conventional lighting key switch.
Figure 8:
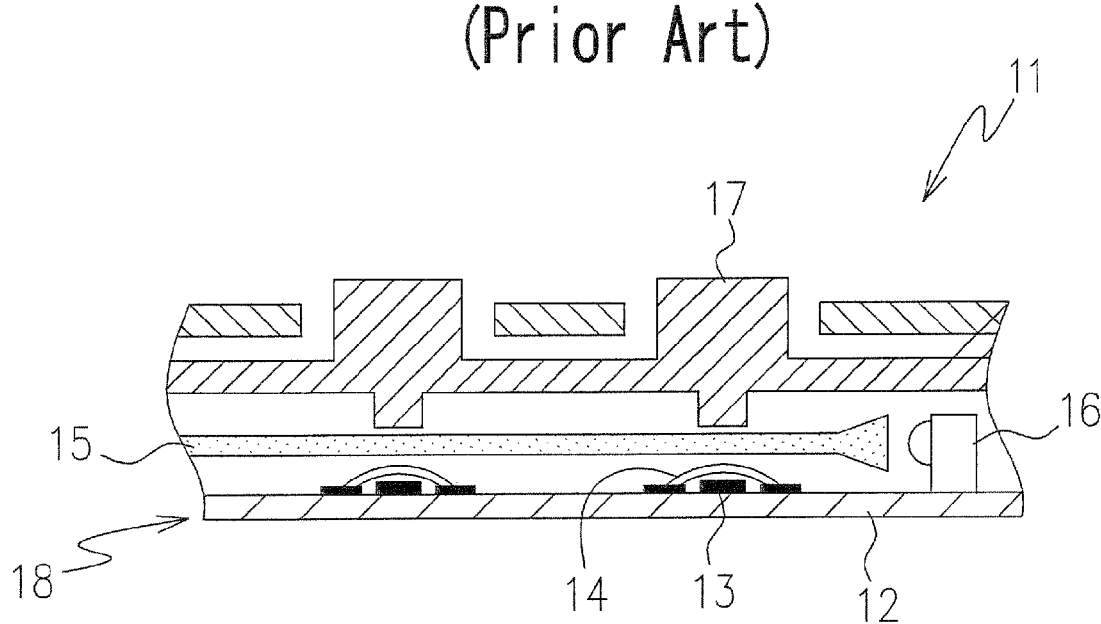
FIG. 8 is a sectional view showing a structure of another conventional lighting key switch.

FIG. 6 illustrates a switch panel 41 including the above-mentioned sheet switch module 21.

The switch panel 41 includes a key top sheet 43 disposed above the sheet switch module 21. The switch panel 41 can be directly installed as an operation panel in various electronic device.

The key top sheet 43 is made of a sheet-like resinous material such as polyimide, polycarbonate or the like, or a soft resinous material such as a thin silicon rubber material and has a thick key top 44 provided on a portion corresponding to each of the movable contacts 24. Each of the key tops 44 is transparent or translucent and provided at a surface thereof with a number or sign showing an input function of each key switch by printing, stamping or the like.

In the switch panel 41, the key switches 25 can be illuminated by the light which is emitted from the LEDs 26 and which has entered the predetermined patterns through the light-receiving parts 27 of the light-guiding sheets 31 and 32 constituting the light-guiding sheet unit 30. Light which is emitted from the LEDs 26 and enters the light-guiding sheets 31 and 32 is reflected on the fixing sheet 29 disposed on the movable contacts 24 of the key switches 25, and the key tops 44 are illuminated by said light reflected on the fixed sheet 29. The switch panel 41 includes a projection 46 which is provided on a back surface of the key top sheet 43 and disposed to face each of the movable contacts 24. The projection 46 supports the light-guiding sheets 31 and 32 in a case in which the light-guiding sheets are held at a small interval from the circuit board 22 at a circumferential part of the key switch 25.

By pressing the key top 44, the corresponding movable contact 24 is bent downward to make electrical connection with the fixed contact 23. Releasing the pressure on the key top 44 causes the movable contact 24 to disengage from the fixed contact 23 due to the resilience of the movable contact 24, thereby breaking the electrical connection between the movable contact and the fixed contact.

In addition, in the case that printed parts 28 such as numbers, signs or the like as shown in FIG. 1 are provided on the back surface of the light-guiding sheet unit 30 facing the key switches 25, a display window is provided in each of the key tops 44 corresponding to each of the printed parts. The display window is formed by, for example, a transparent portion or punched portion. Thereby, the key tops 44 can be brightly illuminated by the light reflected on the printed parts 28 of the light-guiding sheet unit 30. It should be noted that, if the printed parts 28 are set to be larger than the transparent portions or punched portions formed in the key tops 44, it is possible to uniformly illuminate the numbers, signs or the like in the key tops 44.

As mentioned above, in one embodiment, because the sheet switch module according to the present invention includes the light-guiding sheet part which covers the various key switches and is formed by a plurality of light-guiding sheets which are overlapped at least in part, light emitted from the light sources can be efficiently guided to the key switches. If the light sources are provided on each of the light-guiding sheets, it is possible to illuminate the key switches with a high level of brightness and achieve various emission display effects with the key switches.

Although the preferred embodiments of the present invention have been described, it should be noted that the present invention is not limited to these embodiments, and various changes and modifications can be made to the embodiments.

What is claimed is:

1. A sheet switch module, comprising:
   a circuit board;
   at least one key switch mounted on the circuit board;
   a first light-guiding sheet covering an upper surface of the at least one key switch;
   a second light-guiding sheet disposed on the first light-guiding sheet;
   a first light source disposed on the circuit board and configured to emit light into the first light-guiding sheet; and
   a second light source disposed on the circuit board and configured to emit light into the second light-guiding sheet,
   the first light-guiding sheet and the second light-guiding sheet being stacked one above another and overlapped with one another at least in part and each of the first and second light-guiding sheets including light-guiding patterns having shapes that are different from one another.

2. The sheet switch module according to claim 1, wherein the light-guiding pattern included in at least one of the first light-guiding sheet and the second light-guiding sheet is disposed to face the at least one key switch mounted on the circuit board.

3. The sheet switch module according to claim 1, wherein at least one of the first light-guiding sheet and the second light-guiding sheet includes a reflection film disposed on the at least one of the first light-guiding sheet and the second light-guiding sheet, at a position facing each of the at least one key switch mounted on the circuit board.

4. The sheet switch module according to claim 3, wherein the reflection film further includes a protrusion that is disposed at a position facing a substantially central position of the at least one key switch mounted on the circuit board.

5. The sheet switch module according to claim 4, wherein the protrusion comprises a resinous material.

6. The sheet switch module according to claim 1, wherein at least one of the first light-guiding sheet and the second light-guiding sheet includes at least one embossed portion configured to house at least one of the first light source and the second light source.

7. The sheet switch module according to claim 1, wherein the first light-guiding sheet and the second light-guiding sheet are formed by any one of acrylic resin, silicone resin, polycarbonate resin or polyethylene terephthalate resin, and have a thickness within a range of 0.05 mm to 0.3 mm.

8. The sheet switch module according to claim 4, wherein the protrusion is a resinous layer on the surface of the at least one of the first light-guiding sheet and the second light-guiding sheet.

9. The sheet switch module according to claim 1, wherein at least one of the first light-guiding sheet and the second light-guiding sheet includes at least one hole that passes through from an upper surface to a lower surface of at least one end portion of the first light-guiding sheet and the second light-guiding sheet,
   wherein at least one light source of the first light source and the second light source is disposed on the circuit board and is positioned inside the at least one hole that is included in the at least one of the first light-guiding sheet and the second light-guiding sheet.

10. The sheet switch module according to claim 9, wherein the first light source comprises a plurality of light-emitting diodes disposed on at least one end portion of an upper surface of the circuit board, and the second light source comprises a plurality of light-emitting diodes disposed on the at least one end portion of the upper surface of the circuit board.

11. The sheet switch module according to claim 1, wherein each of the first light-guiding sheet and the second light-guiding sheet includes a light shielding area that partitions the light-guiding patterns.

* * * * *